INVENTOR.
J.W. HUTCHINS
BY Hudson & Young
ATTORNEYS

United States Patent Office 2,817,691
Patented Dec. 24, 1957

2,817,691

CATALYST REGENERATION ANALYSIS AND CONTROL

Joseph W. Hutchins, Bartlesville, Okla., assignor to Phillips Petroleum Company, a corporation of Delaware Application September 24, 1953, Serial No. 382,030

12 Claims. (Cl. 260—683.3)

This invention relates to a method of and apparatus for analyzing and/or controlling catalyst regeneration systems.

In the production of butylenes by dehydrogenation of normal butane over a catalyst, it has been discovered that it is of considerable importance both from economical and production viewpoints to maintain the catalyst at a high degree of activity. The most important factor in this regard appears to be the catalyst regeneration to burn carbon deposits off the catalyst. For optimum efficiency of operation the regeneration must be consistent from cycle to cycle and as thorough as the factors of burn-out time and oxygen content in the regeneration gas will permit. During the greater part of the regeneration cycle, temperature measurements may be used to determine burn-out conditions. However, near the end of the cycle a more sensitive measuring system is needed. In this regard it has been proposed to measure the carbon dioxide content of the effluent regeneration gas since it has been established that such carbon dioxide content affords a reliable indication of the completeness of the regeneration of the catalyst.

One method of making such an analysis that has been proposed is by a routine Orsat procedure. However, such a procedure ordinarily is neither desirable nor practical because of the time involved and because the results obtained are intermittent rather than continuous. A second procedure that has been proposed for catalyst regeneration control makes use of an infrared analyzer to measure continuously the carbon dioxide content of the effluent gas during the regeneration cycle. This latter method of control is feasible as long as the input regeneration gas contains no carbon dioxide or contains a generally constant percentage of carbon dioxide. However, in many regeneration systems these conditions do not exist. For example, in the above-mentioned dehydrogenation of normal butane, a flue gas containing varying amounts of carbon dioxide in the general range of approximately seventeen to twenty percent by volume may be used for regeneration. In such a system, a measurement of the carbon dioxide in the effluent gas alone does not provide the desired information regarding the completeness of the regeneration step because this single measurement does not correlate the effluent carbon dioxide with the carbon dioxide present in the input regeneration gas.

The present invention is directed primarily toward providing an improved method of analyzing and controlling a catalyst regeneration system from an analysis of the combustion products generated during the regeneration cycle. This analysis is made by comparing the composition of the input regeneration gas with the composition of the output regeneration gas to afford an accurate determination of the combustion products.

Accordingly, it is an object of this invention to provide a method of analyzing a catalyst regeneration system from a determination of the combustion products formed during regeneration of a catalyst by passing oxygen thereover.

Another object is to provide a method of analyzing a catalyst regeneration system by measuring the difference in carbon dioxide content of the input regeneration gases passed over the catalyst and the effluent regeneration gases.

A further object is to provide a method of controlling a catalyst regeneration system in response to an analysis of the combustion products formed during the regeneration cycle.

A still further object is to provide apparatus which can be employed to carry out the above-mentioned objects.

This invention comprises, generally, a method of analyzing a catalyst regeneration system by comparing the carbon dioxide content of the regeneration gas passed into the catalyst chamber with the carbon dioxide content of the regeneration gas leaving the catalyst chamber. By comparing the carbon dioxide content in two sample streams removed from such points in the regeneration system it is possible to determine directly the amount of carbon dioxide being produced during the regeneration, or, conversely, the reduction in oxygen content in the regeneration gas. This analysis is performed in a continuous manner until it is determined that no carbon dioxide is being produced, at which time the regeneration cycle can be terminated and a feed stream passed over the catalyst once again. In some catalyst regeneration systems an appreciable quantity of carbon monoxide is formed during the regeneration. In these systems the above-mentioned analysis can be performed by comparing the carbon monoxide content in the two sample streams. The differential analysis required by the method of this invention preferably is made by a double beam infrared analyzer which measures the differential concentration of a given component in the two streams circulated through the two sample cells. In some operations the required analysis can be performed continuously by means of a differential refractometer. A control system also is provided in accordance with this invention to terminate the regeneration cycle when completed as indicated by the differential analysis of the gas sample streams.

Other objects, advantages and features of this invention should become apparent from the following detailed description taken in conjunction with the accompanying drawing in which:

Figure 3 is a schematic representation of a differential refractometer which can be employed as the analyzer in the control system of Figure 1.

Figure 1:
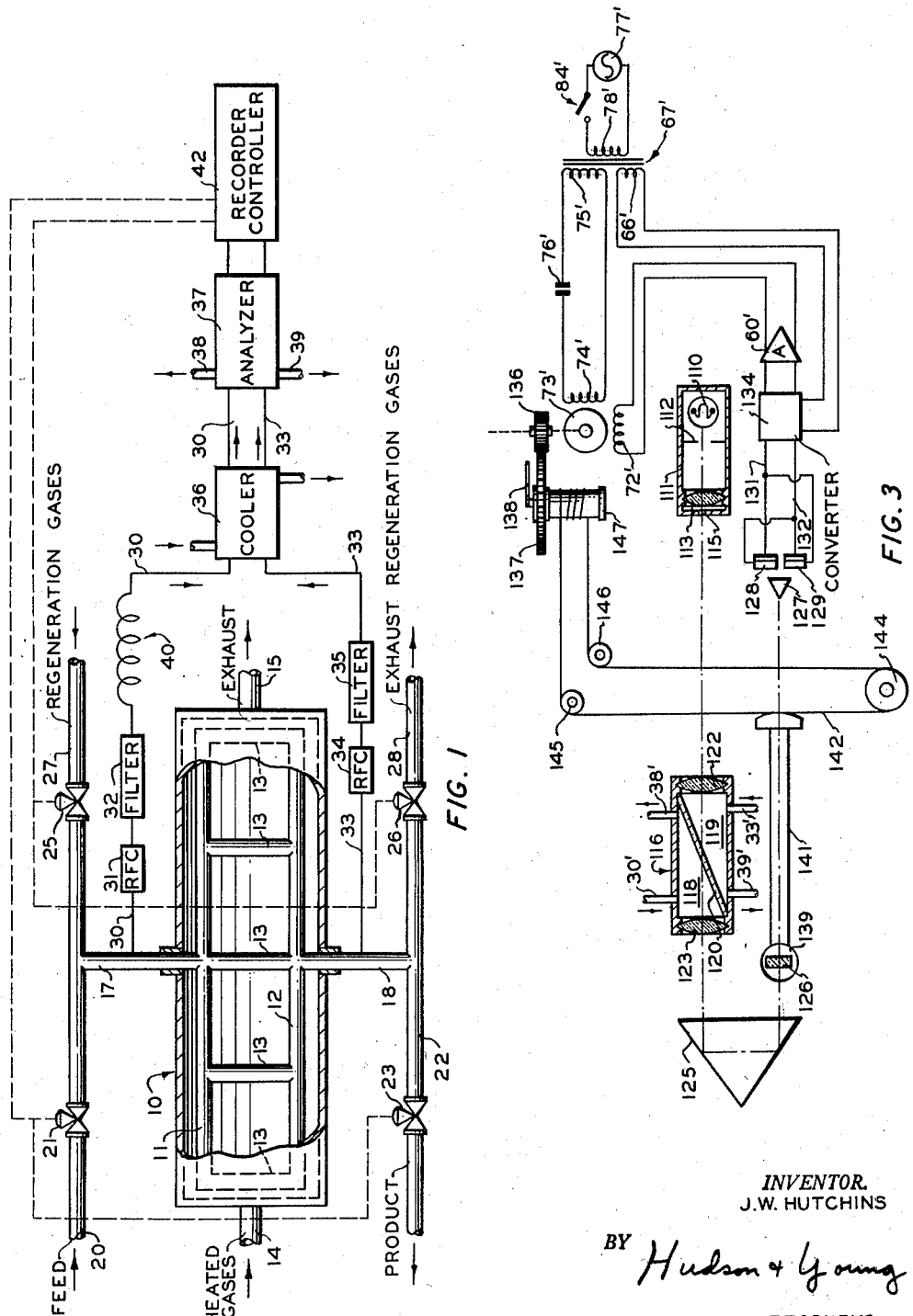
Figure 1 is a schematic representation of a hydrocarbon dehydrogenation chamber having the control system of the present invention incorporated therein.

Referring now to the drawing in detail and to Figure 1 in particular, there is shown a schematic representation of a dehydrogenation chamber 10 which includes an inlet manifold 11 and an outlet manifold 12 interconnected by a plurality of tubes 13 which are filled with a suitable dehydrogenation catalyst. Gases at an elevated temperature enter chamber 10 through a line 14 to heat the catalyst tubes 13. These gases subsequently are exhausted through a line 15. An inlet line 17 communicates with manifold 11 and an outlet line 18 communicates with manifold 12. In operation, a hydrocarbon feed stream is passed to line 17 through a line 20 having a valve 21 therein, thence through tubes 13, and finally out through line 18 to a product line 22 having a valve 23 therein. After a run of a predetermined time it is necessary to regenerate the catalyst in tubes 13 to remove carbon deposits therefrom. This is accomplished by closing valves 21 and 23 and opening valves 25 and 26 which are disposed in respective lines 27 and 28 which communicate with respective lines 17 and 18.

Regeneration gases containing a predetermined quantity of oxygen are then circulated through line 27, tubes 13 and line 28.

For purposes of explaining the operation of the control method of this invention, reference will be made hereinafter to a procedure for dehydrogenating normal butane to produce butylenes. In this example, normal butane is fed through line 20, and tubes 13 are filled with a suitable dehydrogenation catalyst. One particular catalyst that is used to advantage in the dehydrogenation of normal butane comprises alumina pellets coated with chromium oxide, this catalyst being described in detail in U. S. Patent 2,606,159, issued August 5, 1952. The regeneration gases which are fed into the system through line 27 can comprise approximately five to fifteen percent by volume water vapor, two percent oxygen and seventeen to twenty percent carbon dioxide, the remainder being primarily nitrogen. The exhaust regeneration gases leaving the system through line 28 can be recycled back through line 27 if desired with a predetermined quantity of oxygen being added thereto in order to keep the oxygen content of the input regeneration gas at approximately two percent. The temperature of the input regeneration gases is of the order of 1400° F. to 1500° F., whereas the output regeneration gases are at a temperature of approximately 1000° F.

A first sample line 30 communicates with line 17 to remove a sample of the input regeneration gas. A rate of flow controller 31 is positioned in line 30 to maintain a constant flow therethrough and a filter 32 is included in the line to block passage of any solid particles which may be present in the gas stream. A second sample line 33 communicates with line 18 to remove a sample of the exhaust regeneration gases. This line contains a rate of flow controller 34 and a filter 35. Sample lines 30 and 33 pass through a common cooler 36 which reduces the temperature of the sample streams to condense water vapor therein and to equalize the temperatures of both sample streams. From cooler 36, lines 30 and 33 enter an analyzer 37. Line 30 is somewhat longer than line 33, as is represented by coil 40, so as to delay the sample passing through line 30 by the time required for the regeneration gas to pass through chamber 10. In this manner the two samples passing into analyzer 37 are removed from corresponding portions of the regeneration gas. The output signal of analyzer 37 is applied to a recorder-controller unit 42 which controls valves 21, 23, 25 and 26 in the manner described in detail hereinafter.

Figure 2:
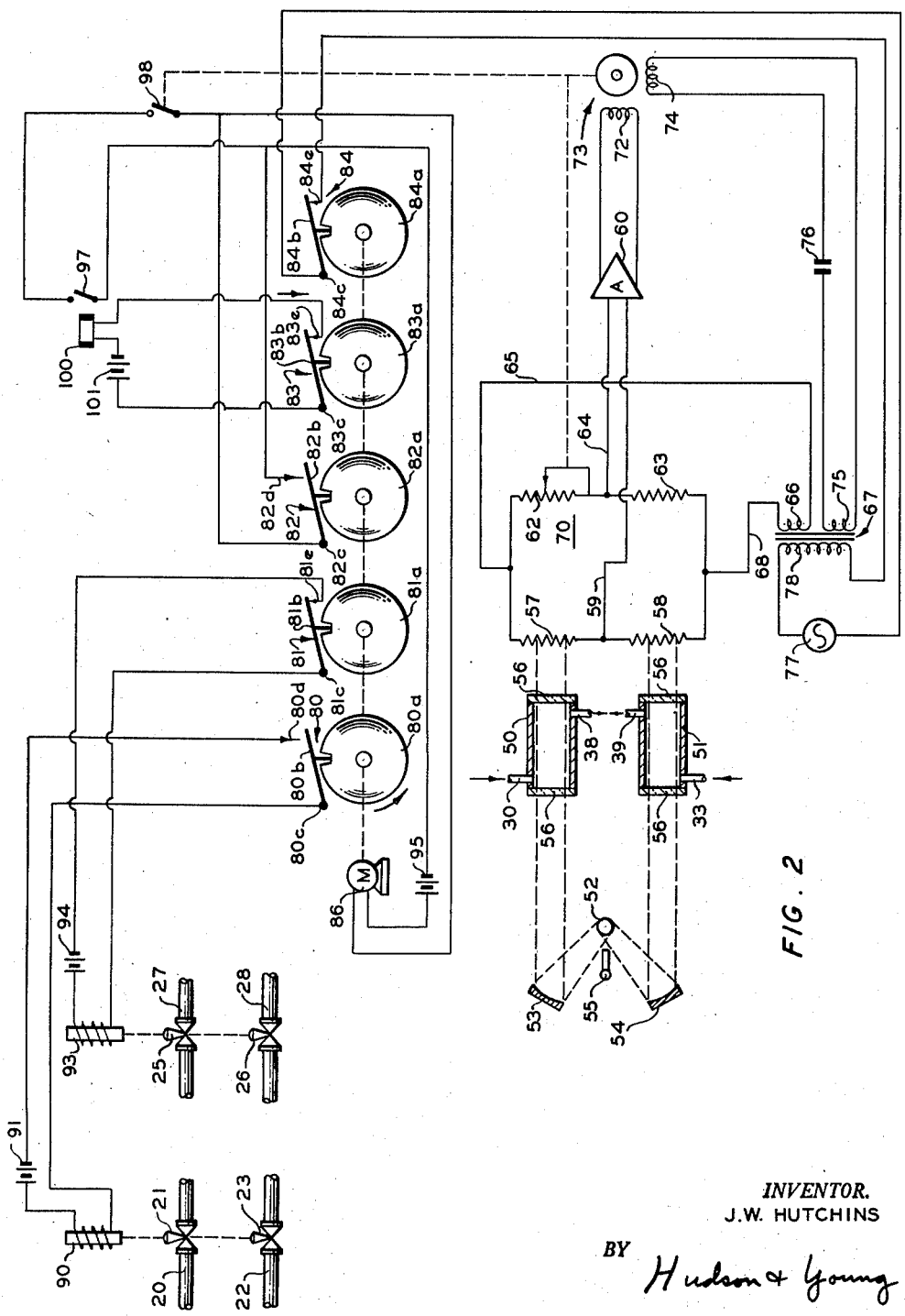
Figure 2 is a schematic representation of an infrared analyzer and electrical control system which can be utilized in the catalyst regeneration system of Figure 1.

In Figure 2 there is illustrated a first embodiment of the apparatus of this invention which incorporates an infrared analyzer to measure the difference in concentration of carbon dioxide in the gas samples removed through lines 30 and 33. The sample stream removed through line 30 passes through a first cell 50 of the analyzer and the sample stream removed through line 33 passes through a second cell 51. Cell 50 contains a vent 38 and cell 51 contains a vent 39. Infrared radiation is emitted from a common source 52 which can be a heated coil of Nichrome wire, for example. Radiation from source 52 is directed through cell 50 by a first concave reflector 53 and through cell 51 by a second concave reflector 54. A trimmer 55 is provided to vary the relative intensities of these two beams. Cells 50 and 51 are provided with inlet and outlet windows 56 which are transparent to radiation in the infrared region. These windows can be formed of quartz, lithium fluoride, calcium fluoride or white sapphire, for example. The radiation directed through cell 50 from reflector 53 impinges upon a first temperature sensitive resistance element 57 and the radiation directed through cell 51 from reflector 54 impinges upon a second temperature sensitive resistance element 58. These elements 57 and 58 preferably are thermistors having relative high temperature coefficients of resistivity.

First terminals of elements 57 and 58 are interconnected and a lead 59 is connected between this common junction and one input terminal of an amplifier 60. The second terminal of element 57 is connected to the first end terminal of a variable resistor 62, and the second end terminal of element 58 is connected to the first end terminal of a resistor 63. The second end terminals of resistors 62 and 63 are connected to one another, and this common junction is connected by a lead 64 to the second input terminal of amplifier 60. The junction between element 57 and resistor 62 is connected by a lead 65 to one end terminal of a secondary winding 66 of a transformer 67. The junction between element 58 and resistor 63 is connected by a lead 68 to the second end terminal of transformer winding 66. Elements 57 and 58 and resistors 62 and 63 thus form the arms of an alternating current Wheatstone bridge circuit 70 which is energized by transformer winding 66. Any electrical unbalance of this bridge circuit is applied to the input terminals of amplifier 60. The output terminals of amplifier 60 are applied across the first winding 72 of a two phase reversible servo motor 73. The second winding 74 of motor 73 is connected across a second secondary winding 75 of transformer 67 through a capacitor 76. Since both windings 72 and 74 of motor 73 are effectively energized from a common voltage source, capacitor 76 is employed to maintain a 90° phase difference in the signal applied to the two motor windings. An alternating current voltage source 77 is applied across the primary winding 78 of transformer 67.

The operation of the infrared analyzer thus far described should now be apparent. As long as cells 50 and 51 are filled with materials having like infrared absorption characteristics, the bridge circuit remains in electrical balance because like quantities of radiation impinge upon elements 57 and 58. However, if the composition of the materials in cells 50 and 51 differ from one another in a manner which changes the infrared absorption characteristics in the two cells, then bridge 70 becomes unbalanced such that an input signal is applied to amplifier 60. This signal in turn actuates motor 73 to move the arm of variable resistor 72 in a direction so as to restore bridge 70 to a condition of electrical balance. The magnitude of the difference of infrared absorption in the two cells is thus indicated by the degree of rotation of motor 73 required to restore bridge 70 to a balanced condition. If desired, variable resistor 62 can form an element of a recorder to provide a continuous record of the difference in intensity of radiation impinging upon elements 57 and 58. As an alternative, motor 73 can be connected directly to a recorder, not shown.

In the particular dehydrogenation procedure above-described, the regeneration gas entering line 27 normally contains two constituents which absorb radiation in the infrared region, namely, water vapor and carbon dioxide. The concentration of water vapor remains the same in sample lines 30 and 33, and, accordingly, remains constant in both cells 50 and 51 to whatever extent present. The amount of carbon dioxide in lines 30 and 33, however, is a direct function of the regeneration of the catalyst in tubes 13. At the beginning of the regeneration cycle nearly all the oxygen contained in the input regeneration gas is converted to carbon dioxide which results in the concentration of carbon dioxide in cell 51 being considerably higher than the concentration of carbon dioxide in cell 50. At the end of the regeneration cycle, the carbon dioxide content in the two cells is substantially equal because no carbon is being burned off the catalyst. Thus, the rotation of motor 73 required to restore the bridge to a balanced condition is a direct function of the differential in concentration of carbon dioxide in sample cells 50 and 51.

In the upper portion of Figure 2 there is shown a control circuit which is adapted to open and close the valves 21, 22, 25 and 26 associated with the dehydrogenation chamber 10 of Figure 1. This control circuit comprises a plurality of switches 80, 81, 82, 83 and 84 which are operated in unison by a motor 86. These switches include respective cams 80a, 81a, 82a, 83a and 84a which are rotated in unison at a predetermined speed by motor 86. Switch arms 80b, 81b, 83b and 84b are hinged at respective terminals 80c, 81c, 82c, 83c and 84c so as to rest upon the periphery of respective cams 80a, 81a, 82a, 83a and 84a. Each of these cams is provided with a narrow cavity such that respective switch arms normally are maintained in an up position but are lowered during a short corresponding portion of each revolution of the cams. Switches 80 and 82 are provided with respective contacts 80d and 82d which are engaged by respective switch arms 80b and 82b when these switch arms are in an up position. Switches 81, 83 and 84 are provided with respective terminals 81e, 83e and 84e which are engaged by respective switch arms 81b, 83b and 84b when these switch arms are in a down position.

Terminal 80c of switch 80 is connected to one terminal of a solenoid 90, the second terminal of which is connected to the first terminal of a voltage source 91. The second terminal of voltage source 91 is connected to terminal 80d such that solenoid 90 is energized when switch arm 80b is in an up position. Solenoid 90 operates valves 20 and 21 whereby these valves are open when current is passed through solenoid 90. Terminal 81c of switch 81 is connected to the first end terminal of a solenoid 93, the second end terminal of which is connected to a voltage source 94. The second end terminal of voltage source 94 is connected to terminal 81e such that solenoid 93 is energized when switch arm 81b is in a down position. Solenoid 93 operates valves 25 and 26 such that these valves are open when solenoid 93 is energized. Motor 86 is energized by a voltage source 95. One end terminal of voltage source 95 is connected to motor 86 and the second end terminal of voltage source 95 is connected both to one terminal of a relay operated switch 97 and to terminal 82d of switch 82. The second terminal of switch 97 is connected to motor 86 through a second switch 98 which is mechanically coupled to motor 73. As can be seen from an inspection of Figure 2, there are two possible circuits for applying voltage source 95 across motor 86. The first of these circuits is through the switches 97 and 98; the second of these circuits is through switch 82 and is completed when switch arm 82b is in an up position. Switch 97 is closed by a time-delay slow-operating relay 100. One terminal of the coil of relay 100 is connected to switch terminal 83e and the second terminal of the coil of relay 100 is connected to switch terminal 83c through a voltage source 101. Switch 84 is connected in circuit with voltage source 77 and transformer winding 78 such that current is supplied to transformer winding 78 whenever switch arm 84b is in a down position.

For purposes of explaining the operation of the control circuit of Figure 2, it is assumed that motor 86 has rotated cams 80a and 84a as illustrated wherein the respective switch arms are in down positions. This corresponds to the beginning of the regeneration cycle. At this point, valves 25 and 26 are opened by closure of switch 81 to energize solenoid 93. Switch 80 is open such that solenoid 90 is deenergized to close valves 21 and 23. Thus, the regeneration gas is passed through chamber 10 and the feed stream is interrupted. At this point, switch 84 is closed to energize the infrared analyzer by the application of current to transformer winding 78. Switch 84 can also control the application of heating current, not shown, to source 52. At the beginning of the regeneration cycle there is a maximum differential in the concentration of carbon dioxide in cells 50 and 51 such that the bridge circuit is unbalanced at a maximum. This results in motor 73 being rotated in a manner such that switch 98, which is mechanically coupled thereto, remains open. At the beginning of the regeneration cycle, switch 83 is closed to energize relay 100. Following a predetermined time interval which can be of the order of a few minutes, for example, switch 97 is closed by relay 100. The reason for this delay in the closure of switch 97 is to provide time for the analyzer to become stabilized under the conditions of a maximum differential in the carbon dioxide content in cells 50 and 51 such that switch 98 remains open.

At the end of the regeneration cycle the concentration of carbon dioxide in cell 51 becomes substantially the same as the concentration of carbon dioxide in cell 50. This restores the bridge circuit to an initial condition of balance. The rotation of motor 73 required to restore this balanced condition serves to close switch 98. Switch 97 is closed by this time such that motor 86 is energized to rotate cams 80a, 81a, 82a, 83a and 84a. This rotation of the switch cams immediately raises the several switch arms to their up positions so as to close switches 80 and 82 and open switches 81, 83 and 84. Valves 21 and 23 are opened and valves 25 and 26 are closed so that the hydrocarbon feed stream once again is passed through the dehydrogenation chamber. The circuit between motor 86 and voltage source 95 remains completed through switch 82 whereby any subsequent opening of switch 98 has no effect on the operation of motor 86. The analyzer itself is deenergized at this time by opening of switch 84. Relay 100 also is deenergized. This second condition continues for the duration of one cycle of rotation of the several cams which time can be one hour, for example. This time is set by suitable gearing, not shown, between motor 86 and the several cams. At the end of the one hour on-stream dehydrogenation period the system is switched back to regeneration and the cycle previously described repeats.

In Figure 3 there is illustrated a differential refractometer type of analyzer which can be employed to measure the differential concentration of carbon dioxide in sample lines 30 and 33. This analyzer comprises a source of light 110 mounted in a housing 111. Source 110 can be an ordinary incandescent bulb emitting radiation in the visible spectrum. Light emitted from source 110 passes through a first aperture 112 and thence through a converging lens 113. A narrow beam of light emerges from housing 111 through a second aperture 115 and is directed through a refractometer cell arrangement 116. The purpose of aperture 112 is to reduce the total radiation transmitted from source 110 to avoid excessive heating of the cell arrangement. The filament of source 110 is near the focal point of lens 113, but slightly therebeyond; and aperture 115 is disposed in close proximity to lens 113. Cell 116 includes a first chamber 118 supplied with an inlet conduit 30' connected to line 30 and a second chamber 119 supplied with an inlet conduit 33' connected to line 33. Chambers 118 and 119 are vented by respective conduits 38' and 39'. Chambers 118 and 119 are separated by a diagonal transverse plate 120 constructed of a material such as glass which is transparent to the light beam from source 110. A converging lens 122 defines one opening of chamber 119 and a second converging lens 123 defines a corresponding opening of chamber 118. The components thus far described are arranged such that aperture 115 is at the effective principal focus of lens 122. In this manner a narrow beam of light enters chamber 119 and emerges from chamber 118 through lens 123.

The light beam emerging from lens 123 enters a glass prism 125 disposed such that its front surface is perpendicular to the path of light. The light beam is twice reflected in prism 125 and emerges therefrom to pass through a rotatable block of glass 126 having its two surfaces substantially perpendicular to the path of radiation. From glass block 126 the light beam passes through a second prism 127 disposed such that the light beam normally strikes the apex of the prism in a line perpendicular to the base of the prism. A radiation detector unit comprising first and second photovoltaic cells 128 and 129 is positioned such that a light beam striking the apex of prism 127 normally impinges equally upon adjacent positioned cells 128 and 129. The outputs of cells 128 and 129 are connected in opposition by means of electrical leads 131 and 132 to produce a resulting voltage proportional to the difference in total radiation incident upon the two cells. The voltage appearing between leads 131 and 132 is converted to an alternating potential by a converter 134 and is amplified by an amplifier 60', the output of which is applied to a coil 72' of reversible motor 73'. The shaft of motor 73' carries a gear 136 which engages a second gear 137. Gear 137 carries a pointer 138 which is mounted to indicate the degree of rotation of motor 73' produced by the output electrical signal from amplifier 60'. Glass block 126 is mounted centrally on a rotatable base 139 having a pivot point at the center thereof. Base 139 is provided with an arm 141 which is attached to a cable 142. Cable 142 passes about suitable support posts 144, 145 and 146 and is wrapped about the shaft 147 attached to gear 137. Thus, rotation of gears 136 and 137 in response to the output signal from amplifier 60' moves cable 142 to rotate glass block 126 about its mid point. Converter 134 is energized from a secondary transformer winding 66' of a transformer 67'. Primary winding 78' of transformer 67' is connected to a voltage source 77' through a switch 84'. A second secondary winding 75' of transformer 67' is connected to motor winding 74' through a capacitor 76'. Thus, converter 134 changes the output voltage from cells 128 and 129 into an alternating signal of the same frequency as source 77'.

If the refractive indices of the gases contained in chambers 118 and 119 are equal, the light beam emerging from cell 116 is in optical alignment with the light beam entering said cell 116. The apparatus is positioned initially such that an undeviated light beam strikes the apex of prism 127 and is directed in equal intensities upon cells 128 and 129. However, should the refractive indices of the two gases differ from one another the emerging light beam is deviated in one direction or the other by cell 116 such that a greater intensity of radiation is incident upon either cell 128 or cell 129. This in turn causes an unbalanced voltage, which after amplification, drives motor 73'. The rotation of motor 73' in turn drives gear 136 to rotate glass block 126 through the connecting linkage of cable 142 and arm 141. This rotation of block 126 is such as to deviate the light beam in the opposite direction from the deviation by cell 116 and continues as long as unequal intensities of radiation are incident upon cells 128 and 129. The degree of this rotation, as indicated by pointer 138, is the measure of the difference in refractive indices between the two gases in cell 116. Motor 73' also operates switch 98 in the control system of Figure 2 in the same manner as described above.

In some operations it may be desired that the analyzer remain energized at all times. This is readily accomplished by the elimination of switch 84. Furthermore, the analyzer can be standardized as often as desired by passing a common fluid through both cells. A switching arrangement to accomplish this type of standardization is disclosed in U. S. Patent 2,579,825, issued December 25, 1951. The regeneration gas can conveniently be employed for this standardization.

In most regeneration systems the infrared analyzer is preferred over the differential refractometer. This is true because the oxygen which is converted to carbon dioxide does not absorb infrared radiation in the region of interest. Thus, any change in radiation absorption is due to a change in carbon dioxide content. Oxygen, however, has a refractive index, as do the other constituents of the regeneration gas. Even so, for the most part, the other constituents remain substantially constant in concentration whereby any change in refractive index is a function of the decrease of oxygen and increase of carbon dioxide. In some regeneration processes, considerable carbon monoxide is formed. This latter type of process can be controlled in the same manner as described above in conjunction with carbon dioxide since carbon monoxide absorbs selected wave lengths in the infrared spectrum. In this case the presence of carbon monoxide and/or carbon dioxide is detected. The measurement of carbon dioxide and/or carbon monoxide obviously results in a measurement of the decrease in oxygen content.

While this invention has been described in conjunction with present preferred embodiments thereof, it should be apparent that the invention is not limited thereto.

What is claimed is:

1. The method of controlling a catalytic reaction wherein the catalyst employed requires periodic regeneration which comprises passing material to be reacted into contact with a catalyst for a predetermined time, discontinuing the passage of said material to be reacted into contact with said catalyst and passing regeneration material into contact with said catalyst, continuously withdrawing a first sample of said regeneration material prior to its passage into contact with said catalyst, continuously withdrawing a second sample of said regeneration material following its contact with said catalyst, continuously measuring the difference in composition of said regeneration material before and after contact with said catalyst, discontinuing the passage of said regeneration material in contact with said catalyst when a predetermined relationship exists between the composition of said regeneration material in said first and second samples, and thereafter passing said material to be reacted into contact with said catalyst to initiate the following cycle.

2. The method of controlling a hydrocarbon dehydrogenation catalytic reaction wherein the catalyst employed requires periodic regeneration to burn carbon deposits therefrom which comprises passing a stream of hydrocarbons to be reacted into contact with a dehydogenation catalyst for a predetermined time, discontinuing the passage of said hydrocarbon stream to be reacted into contact with said catalyst and passing a regeneration gas including oxygen and carbon dioxide into contact with said catalyst, continuously withdrawing a first sample of said regeneration gas prior to its passage into contact with said catalyst, continuously withdrawing a second sample of said regeneration gas following its contact with said catalyst, continuously measuring the differential concentration of carbon dioxide in said first and second samples, discontinuing the passage of said regeneration gas in contact with said catalyst when a predetermined relationship exists between the concentration of carbon dioxide in said first and second samples, and thereafter passing said hydrocarbon stream to be reacted into contact with said catalyst to initiate the following cycle.

3. Apparatus for determining the completeness of a catalyst regeneration process which comprises a catalyst containing reaction chamber having inlet and outlet conduits connected thereto for the passage of regeneration gas through said chamber, a first sample line communicating with said inlet conduit, a second sample line communicating with said outlet conduit, an analyzer to detect differences in composition of two fluid streams circulated therethrough, and means to connect said first and second sample lines to said analyzer.

4. Apparatus for determining the completeness of a catalyst regeneration operation in a catalyst containing reaction chamber having inlet and outlet conduits connected thereto for the passage of regeneration gas through said chamber, comprising a first sample cell having windows transparent to infrared radiation, a second sample cell having windows transparent to infrared radiation, means for directing respective beams of infrared radiation through said first and second sample cells, a first sample line communicating between said first sample cell and said inlet conduit, a second sample line communicating between said second sample cell and said outlet conduit, said first sample line including means to delay passage of material through said first sample line to said first sample cell by the time required for the passage of regeneration gas between said inlet and outlet conduits through said reaction chamber, and means for comparing the resulting intensities of the radiation beams transmitted through said first and second sample cells.

5. Apparatus for determining the completeness of a catalyst regeneration operation in a catalyst containing reaction chamber having inlet and outlet conduits connected thereto for the passage of regeneration gas through said chamber, comprising a first sample cell having transparent windows, a second sample cell having transparent windows, means for directing a beam of radiation sucessively through said first and second sample cells, a radiation transparent window dividing said first and second sample cells whereby said beam of radiation directed through said cells is deviated by an amount proportional to the difference in refractive indices of the materials in said first and second cells, a first sample line communicating between said inlet conduit and said first sample cell, a second sample line communicating between said outlet conduit and said second sample cell, said first sample line including means to delay passage of gas therethrough by the time required for the regeneration gas to pass between said inlet and outlet conduits through said reaction chamber, and means to measure the deviation of said radiation beam passed through said first and second sample cells.

6. Process control apparatus for use with a catalyst containing reaction chamber comprising, in combination, a first inlet conduit communicating with said chamber for passing a feed stream into the chamber, a first valve in said first conduit, a second conduit communicating with said chamber for passing regeneration gases into the chamber, a second valve in said second conduit, a third conduit communicating with said chamber for passing a product stream from the chamber, a third valve in said third conduit, a fourth conduit communicating with said chamber for removing from the chamber the regeneration gases passed through said second conduit, a fourth valve in said fourth conduit, a first sample line communicating with said second conduit, a second sample line communicating with said fourth conduit, an analyzer to detect differences in composition of two fluid streams circulated therethrough, means to connect said first and second sample lines to said analyzer, and means actuated by said analyzer to open said first and third valves and to close said second and fourth valves when the differential composition of the two fluid streams circulated through said analyzer is at a predetermined value.

7. Process control apparatus for use with a catalyst containing reaction chamber comprising, in combination, a first inlet conduit communicating with said chamber for passing a feed stream into the chamber, a first valve in said first conduit, a second conduit communicating with said chamber for passing regeneration gases into the chamber, a second valve in said second conduit, a third conduit communicating with said chamber for passing a product stream from the chamber, a third valve in said third conduit, a fourth conduit communicating with said chamber for removing from the chamber the regeneration gases passed through said second conduit, a fourth valve in said fourth conduit, a first sample line communicating with said second conduit, a second sample line communicating with said fourth conduit, a first sample cell having windows transparent to infrared radiation, a second sample cell having windows transparent in infrared radiation, means for directing respective beams of infrared radiation through said first and second sample cells, a first sample line communicating between said first sample cell and said second conduit, a second sample line communicating between said second sample cell and said fourth conduit, said first sample line including means to delay passage of material through said first sample line to said first sample cell by substantially the time required for the passage of regeneration gas between said second and fourth conduits through said reaction chamber, means for comparing the resulting intensities of the radiation beams transmitted through said first and second sample cells, and means actuated by said comparing means to open said first and third valves and to close said second and fourth valves when the differential composition of the two fluid streams circulated through said analyzer is at a predetermined value.

8. Process control apparatus for use with a catalyst containing reaction chamber comprising, in combination, a first inlet conduit communicating with said chamber for passing a feed stream into the chamber, a first valve in said first conduit, a second conduit communicating with said chamber for passing regeneration gases into the chamber, a second valve in said second conduit, a third conduit communicating with said chamber for passing a product stream from the chamber, a third valve in said third conduit, a fourth conduit communicating with said chamber for removing from the chamber the regeneration gases passed through said second conduit, a fourth valve in said fourth conduit, a first sample cell having transparent windows, a second sample cell having transparent windows, means for directing a beam of radiation successively through said first and second sample cells, a radiation transparent window dividing said first and second sample cells whereby said beam of radiation directed through said cells is deviated by an amount proportional to the difference in refractive indices of the materials in said first and second cells, a first sample line communicating between said second conduit and said first sample cell, a second sample line communicating between said fourth conduit and said second sample cell, said first sample line including means to delay passage of gases therethrough by substantially the time required for the regeneration gas to pass between said second and fourth conduits through said reaction chamber, means to measure the deviation of said radiation beam passed through said first and second sample cells, and means controlled by said deviation measuring means to open said first and third valves and to close said second and fourth valves when the differential composition of the two fluid streams circulated through said analyzer is at a predetermined value.

9. Process control apparatus for use with a catalyst containing reaction chamber comprising, in combination, a first inlet conduit communicating with said chamber for passing a feed stream into the chamber, a first valve in said first conduit, a second conduit communicating with said chamber for passing regeneration gases into the chamber, a second valve in said second conduit, a third conduit communicating with said chamber for passing a product stream from the chamber, a third valve in said third conduit, a fourth conduit communicating with said chamber for removing from the chamber the regeneration gases passed through said second conduit, a fourth valve in said fourth conduit, a first sample line communicating with said second conduit, a second sample line communicating with said fourth conduit, a first sample cell having windows transparent to infrared radiation, means for directing respective beams of infrared radiation through said first and second sample cells, a first sample line communicating between said first sample cell and said second conduit, a flow rate controller in said first line to maintain a predetermined rate of flow therethrough, a second sample line communicating between said second sample cell and said fourth conduit, a flow rate controller in said second line to maintain a predetermined rate of flow therethrough, said first and second sample lines being of such relative lengths that the time required for passage of gases through said first sample line is greater than the time required for passage of gases through said second sample line by the time required for the regeneration gases to pass between said second and fourth conduits through said chamber, heat exchange means to maintain the samples passed through said first and second sample lines at a common temperature, means for comparing the resulting intensities of the radiation beams transmitted through said first and second sample cells, and means actuated by said comparing means to open said first and third valves and to close said second and fourth valves when the differential composition of the two fluid streams circulated through said analyzer is at a predetermined value.

10. Process control apparatus for use with a catalyst containing reaction chamber comprising, in combination, a first inlet conduit communicating with said chamber for passing a feed stream into the chamber, a first valve in said first conduit, a second conduit communicating with said chamber for passing regeneration gases into the chamber, a second valve in said second conduit, a third conduit communicating with said chamber for passing a product stream from the chamber, a third valve in said third conduit, a fourth conduit communicating with said chamber for removing from the chamber the regeneration gases passed through said second conduit, a fourth valve in said fourth conduit, a first sample cell having transparent windows, a second sample cell having transparent windows, means for directing a beam of radiation successively through said first and second sample cells, a radiation transparent window dividing said first and second sample cells whereby said beam of radiation directed through said cells is deviated by an amount proportional to the difference in refractive indices of the materials in said first and second cells, a first sample line communicating between said first sample cell and said second conduit, a flow rate controller in said first line to maintain a predetermined rate of flow therethrough, a second sample line communicating between said second sample cell and said fourth conduit, a flow rate controller in said second line to maintain a predetermined rate of flow therethrough, said first and second sample lines being of such relative lengths that the time required for passage of gases through said first sample line is greater than the time required for passage of gases through said second sample line by the time required for the regeneration gases to pass between said second and fourth conduits through said chamber, heat exchange means to maintain the samples passed through said first and second sample lines at a common temperature, means to measure the deviation of said radiation of said radiation beam passed through said first and second sample cells, and means controlled by said deviation measuring means to open said first and third valves and to close said second and fourth valves when the differential composition of the two fluid streams circulated through said analyzer is at a predetermined value.

11. The method of controlling a catalytic reactor wherein the catalyst employed requires periodic regeneration which comprises passing material to be reacted into contact with a catalyst for a predetermined time, discontinuing the passage of said material to be reacted into contact with said catalyst and passing regeneration material into contact with said catalyst, continuously withdrawing a first sample of said regeneration material prior to its passage into contact with said catalyst, continuously withdrawing a second sample of said regeneration material following its contact with said catalyst, continuously passing a first beam of infrared radiation through said first sample, continuously passing a second beam of infrared radiation through said second sample, continuously comparing the resulting intensities of said first and second beams of radiation, discontinuing the passage of said regeneration material in contact with said catalyst when a predetermined relationship exists between the composition of said regeneration material in said first and second samples as indicated by the compared intensities of said beams of radiation, and thereafter passing said material to be reacted into contact with said catalyst to initiate the following cycle.

12. The method of controlling a catalytic reactor wherein the catalyst employed requires periodic regeneration which comprises passing material to be reacted into contact with a catalyst for a predetermined time, discontinuing the passage of said material to be reacted into contact with said catalyst and passing regeneration material into contact with said catalyst, continuously withdrawing a first sample of said regeneration material prior to its passage into contact with said catalyst, continuously withdrawing a second sample of said regeneration material following its contact with said catalyst, continuously measuring the difference in refractive indices of said first and second samples, discontinuing the passage of said regeneration material in contact with said catalyst when a predetermined relationship exists between the composition of said regeneration material in said first and second samples as indicated by the measured differences in refractive indices, and thereafter passing said material to be reacted into contact with said catalyst to initiate the following cycle.

References Cited in the file of this patent

UNITED STATES PATENTS

| | | |
|---|---|---|
| 2,487,717 | Maker et al. | Nov. 8, 1949 |
| 2,519,081 | Skarstrom | Aug. 15, 1950 |
| 2,547,212 | Jamison et al. | Apr. 3, 1951 |
| 2,685,649 | Miller | Aug. 3, 1954 |